United States Patent [19]
Fajac

[11] Patent Number: 5,148,466
[45] Date of Patent: Sep. 15, 1992

[54] DEVICE FOR INSTALLING MAMMOGRAPHY CARTRIDGES OF DIFFERENT FORMATS

[75] Inventor: Claude Fajac, Paris, France

[73] Assignee: General Electric CGR S.A., Issy les Molineaux, France

[21] Appl. No.: 663,461

[22] Filed: Mar. 4, 1991

[30] Foreign Application Priority Data

Mar. 8, 1990 [FR] France .................. 90 02932

[51] Int. Cl.$^5$ .......................................... G03B 42/02
[52] U.S. Cl. ..................... 378/167; 378/169; 378/181; 378/182; 378/170
[58] Field of Search ............... 378/167, 169, 181, 170, 378/177, 182, 176, 91

[56] References Cited

U.S. PATENT DOCUMENTS

| | | | |
|---|---|---|---|
| 3,792,283 | 12/1974 | Lebra | 378/181 |
| 3,826,922 | 4/1974 | Ingles | 378/181 |
| 3,920,997 | 2/1975 | Munch | 378/91 |
| 3,968,375 | 7/1976 | Peyser et al. | 378/181 |
| 4,845,734 | 7/1989 | Maki et al. | 378/181 |
| 4,930,147 | 5/1990 | Dieterlen et al. | 378/176 |
| 4,989,227 | 1/1991 | Tirelli et al. | 378/177 |
| 5,073,916 | 12/1991 | Mirlieb et al. | 378/181 |

Primary Examiner—Constantine Hannaher
Assistant Examiner—Kim-Kwok Chu
Attorney, Agent, or Firm—Walter C. Farley

[57] ABSTRACT

An X-ray apparatus includes a moving carriage having two levers hinged and designed to move equally and in opposite directions by a gear system. The movements of the levers are guided by at least one groove formed in a supporting plate, with a peg fixed to the lever co-operating with the groove. The groove includes at least two spaced-apart rectilinear portions, each corresponding to a different size of cartridge, thereby enabling the cartridge to be moved on the supporting plate.

10 Claims, 4 Drawing Sheets

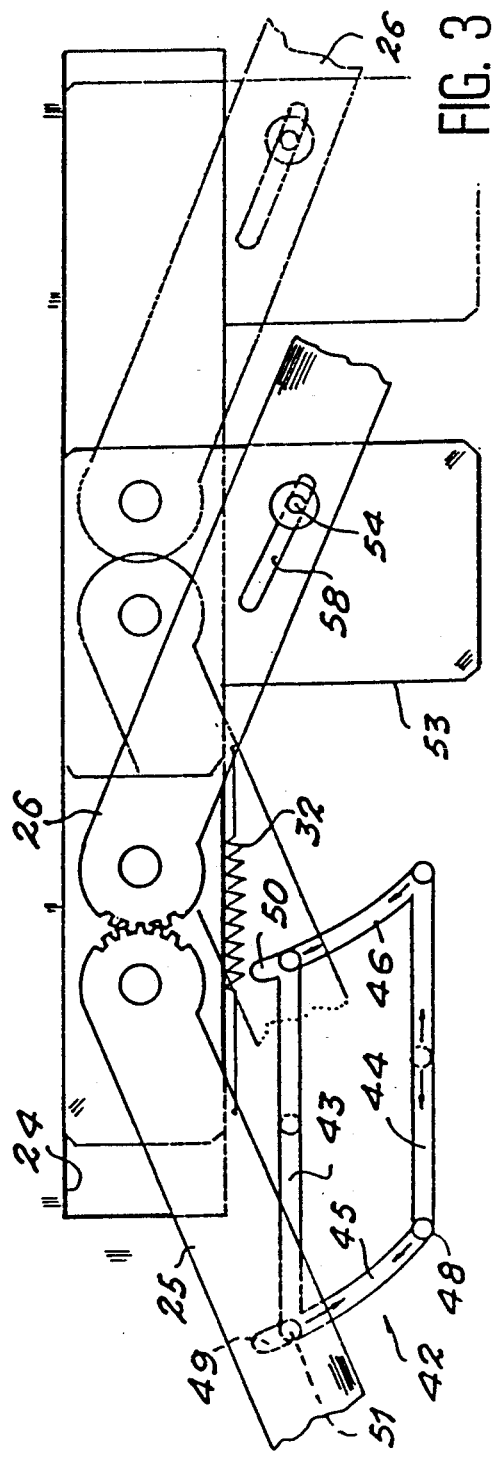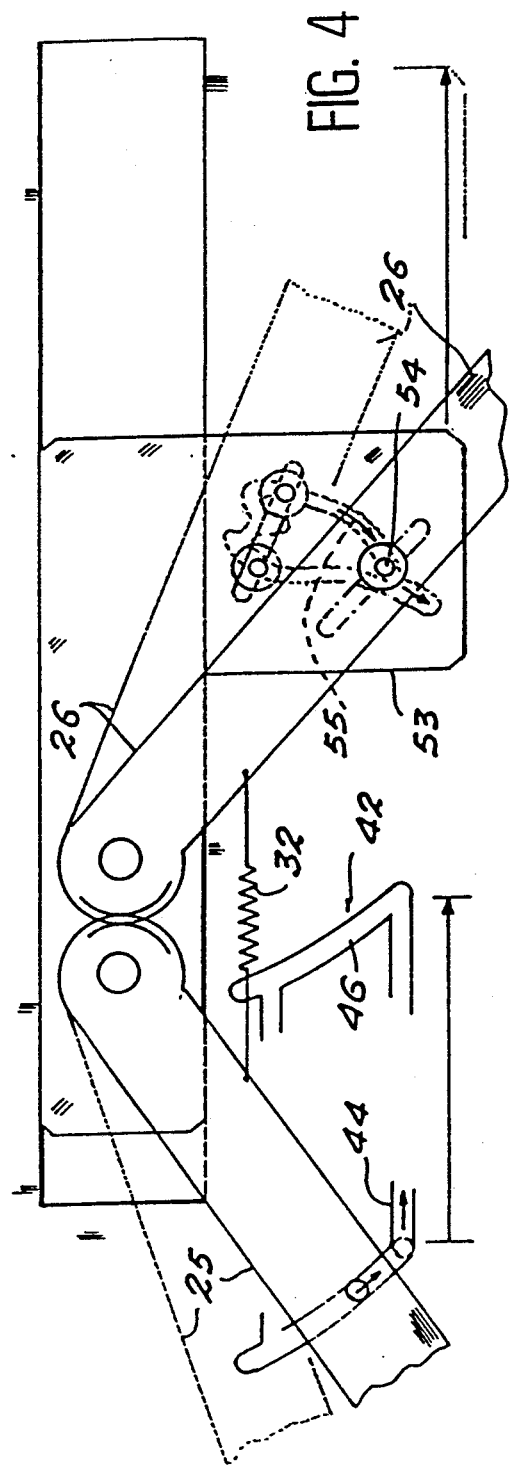

DEVICE FOR INSTALLING MAMMOGRAPHY CARTRIDGES OF DIFFERENT FORMATS

The invention relates to mammographic apparatus, and more particularly it relates to devices in such apparatuses for installing a cartridge containing the X-ray film on its support, regardless of the format of the cartridge.

BACKGROUND OF THE INVENTION

As shown in FIG. 1, mammographic type X-ray systems comprise an X-ray source 10 carried on a bracket 11 disposed at the top of a vertical plate 12. The plate carries an assembly 13 on which a breast 16 under examination is placed, resting on a horizontal shelf 15. A pad 17 which is transparent to X-rays and which is movable vertically along the plate 12 is used to compress the breast 16.

In order to adapt to the size of the patient, the plate 12 is mounted on a vertical column 9 which stands on the ground, and the plate 12 is vertically displaceable along the column by appropriate mechanical means.

Beneath the shelf 15, the top of the assembly 13 includes a tunnel in which a device is housed for receiving a cartridge 18. The cartridge is constituted by a light-proof box housing at least one film 14 which is sensitive to X-rays. A latent image of the breast is formed on this film after an appropriate exposure time, and a picture is obtained by developing the film.

The device containing the cartridge, referred to as the "cartridge support", is a removable item which is slid into the tunnel before exposure and into which the cartridge is inserted. X-ray-sensitive films come in standard sizes, e.g. 18 cm×24 cm or 24 cm×30 cm, and the same applies to the cartridges which are designed to contain them and to the cartridge supports.

In order to switch from a cartridge of a given size to another of a different size, it is normally necessary to change the cartridge support at the same time. A cartridge support is generally provided for each size of cartridge, thereby constituting a kind of adaptor which is associated with each type of cartridge. This gives rise to additional expense when it is desired to use a given mammograph with all of the normal sizes of cartridge, and it also required that bulky items, such as the cartridge support, are handled during examination. An object of the present invention is therefore to provide a device for installing cartridges, which device is capable of adapting to the various sizes of the cartridge that are used in this application. Such devices already exist, and one such device is described in U.S. patent application Ser. No. 07/497709 filed Mar. 23, 1990, now U.S. Pat. No. 4,989,227.

This prior art device suffers from the drawback of being complicated and therefore of being relatively expensive. Another object of the present invention is therefore to provide a device for installing mammography cartridges which is simple in design and cheap.

SUMMARY OF THE INVENTION

The present invention provides a device for installing cartridges of different formats on a plate, the device comprising:
- a carriage capable of moving parallel to the direction along which a cartridge is installed on said plate;
- two levers movable in rotation and carried by said carriage, with the rotary motions of the levers being equal and opposite, the ends of said levers being designed to hold two corners of said cartridge in resilient manner;
- at least one first groove formed on said plate;
- at least one first peg fixed to one of the two levers and co-operating with said first groove; and
- the path followed by the said first groove being designed firstly to allow said levers to rotate to adapt the distance between them to the size of the cartridge, and secondly to allow the cartridge to be displaced over said plate.

The levers are provided with a traction spring in order to return them to the cartridge-clamping position. In order to impose a cartridge installation sequence, the device further includes:
- a second groove formed on the carriage; and
- a second peg carried by one of said two rotatable levers, which second peg is movable along said lever and co-operates with said second groove;

said second groove being of the labyrinth type and being designed to impose a sequence of different spreads between said levers.

BRIEF DESCRIPTION OF THE DRAWINGS

An embodiment of the invention is described by way of example with reference to the accompanying drawings, in which:

FIGS. 3, 4, and 5a-5e are schematic views of the device of the invention enabling the operation of the device to be understood;

DETAILED DESCRIPTION

Figure 1:
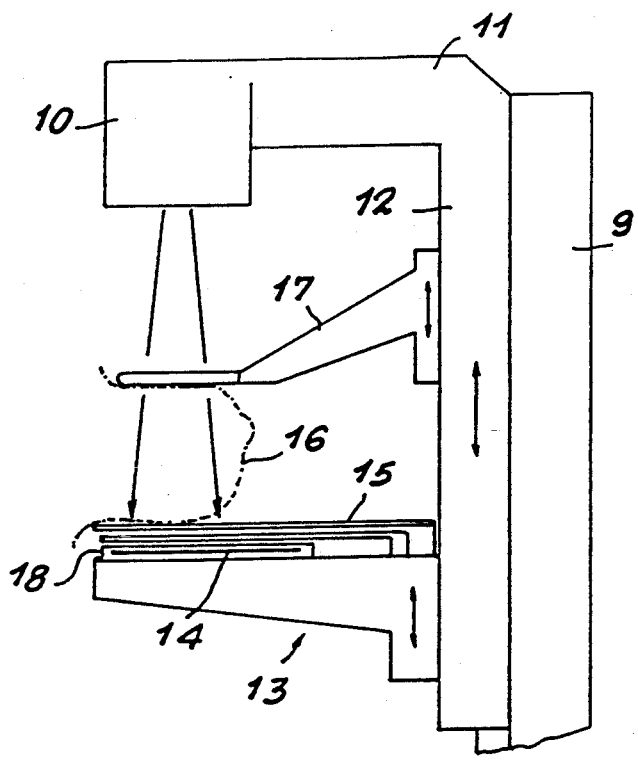
FIG. 1 is a schematic side view of a mammograph.

FIG. 1 shows the main parts of a mammograph and has been described in the preamble.

Figure 2:
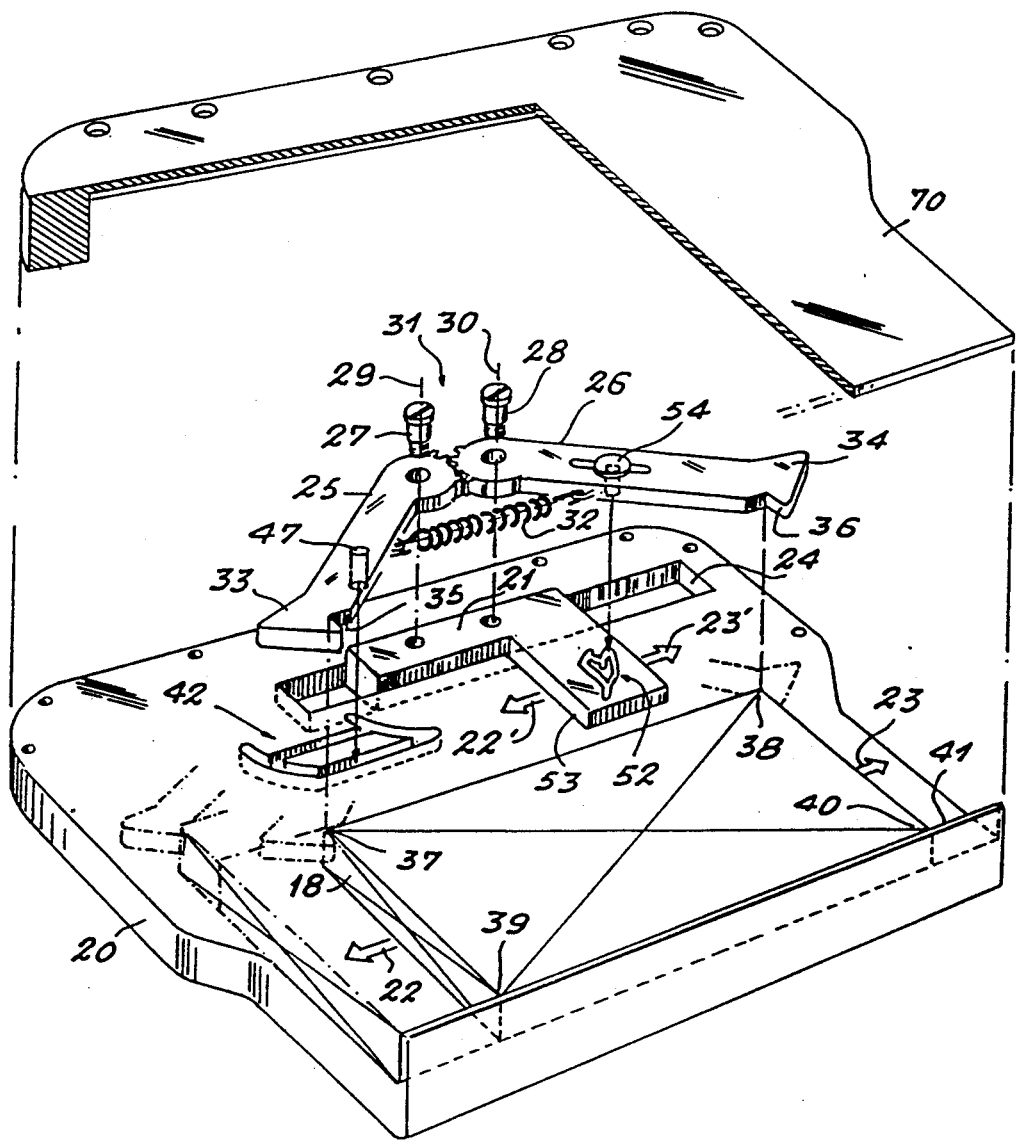
FIG. 2 is an exploded isometric view of an embodiment of a device for installing cartridges in accordance with the invention.

As shown in the exploded isometric view of FIG. 2, with a lid 70 removed, the device of the invention for installing a cartridge 18 on a plate 20 comprises a carriage 21 which is movable according to parallel arrows 22 and 23 which show the insertion and removal directions for a cartridge 18. In order to enable the carriage 21 to move, the plate 20 includes a slot 24 which enables the carriage 21 to be connected to translation drive means (not shown).

The carriage 21 serves as a support for two equal-length levers 25 and 26 which are mounted on the said support by means of elements 27 and 28 enabling them to rotate about axes 29 and 30. The rotary movements of the levers 25 and 26 are designed to be equal and opposite by a gear system 31 such that any rotation of one of them corresponds to a rotation of equal amplitude and in the opposite direction of the other. A tension spring 32 has one end connected to each of the levers, and urges the two levers towards each other so as to reduce the angle between them.

The ends 33 and 34 of the levers 25 and 26 are provided with respective notches 35 and 36 each of which receives one (37 or 38) of the four corners 37, 38, 39, and 40 of the cartridge 18, with the other two corners coming into abutment against the front face 41 of the plate 20. One of the levers, e.g. the lever 25, carries a fixed peg 47 whose bottom ends co-operates with a groove 42 in the plate 20.

This first groove 42 is formed in the thickness of the plate 20 and is generally parallelogram-shaped (FIG. 3) having two rectilinear sides 43 and 44 which are parallel to each other and to the direction of the arrows 22 and 23, and two curved sides 45 and 46 which are circular arcs of radius equal to the distance between the axis 29 and the peg 47. The circular arcs 45 and 46 include respective extensions 49 and 50.

Figure 6A:
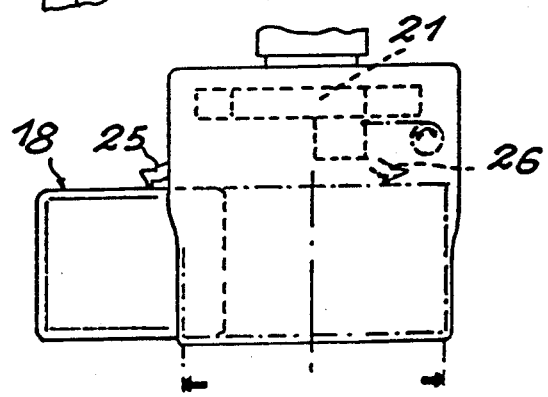
FIGS. 6a and 6b are schematic views showing a cartridge being installed in the device of the invention.

The device as described above and having only one groove 42 operates as follows. In the rest position, the carriage 21 is at the end of its stroke at one side or the other of the plate 20, e.g. in its leftmost position (FIG. 6a). In this position, the peg 47 is in the bottom left corner 48 of the first groove 42 (FIG. 3) and the end 33 of the lever 25 is in its low position. In order to install a cartridge 18, it is sufficient to rotate the end 33 of the lever 25 whose peg 47 slides in the circular arcuate portion 45.

When the cartridge is large, the peg 47 moves into the extension 49, but it returns to position 51 once the cartridge 18 is in place. In each of positions 48 (small cartridge) and 51 (large cartridge), the peg 47 is free to slide in one of the rectilinear portions 43 and 44 of the groove, thereby enabling the carriage 21 to be displaced sideways, and thus displacing the cartridge 18 relative to the plate 20 and enabling it to take up the required position.

Naturally, the peg 47 could be carried by the other lever 26 so as to co-operate with a different groove similar to the groove 42 and disposed to the right of the plate 20 relative to the axes of rotation 29 and 30 of the levers 25 and 26. In accordance with another feature of the invention, the device for installing cartridges includes a second groove 52 formed in an extension 53 of the carriage 21 and co-operating with a second peg 54 which is mounted to move in translation along the arm 26 by means of a sliding slot 58 (assuming that the first peg 47 is mounted on the arm 25). The groove 52 is of the labyrinth type since it can be followed by the peg 54 in one direction only, namely the direction indicated by arrow 55 (FIG. 4). To make this possible, the groove 52 includes traps 56 and 57 (FIG. 5), with the trap 56 corresponding to a large cartridge and the trap 57 to a small cartridge.

In order to prevent the peg 54 from sliding under gravity in the slot 58 when the device is used vertically for an axillary image, a resilient braking system (not shown) is provided to brake the motion of the peg 54 in the sliding slot 58. This resilient system may be constituted, for example, by a spring blade exerting a force on the peg 54 urging it back towards the end 59 of the slot 58.

FIGS. 4 and 5 show the operation of the cartridge installing device that includes a groove 52. The rest position may be the position shown in FIG. 5a, for example, with the lever 26 then being in position A and the peg 54 being at the end of the trap 57. This position is a rest position whether or not a small cartridge is present.

Figure 5A:
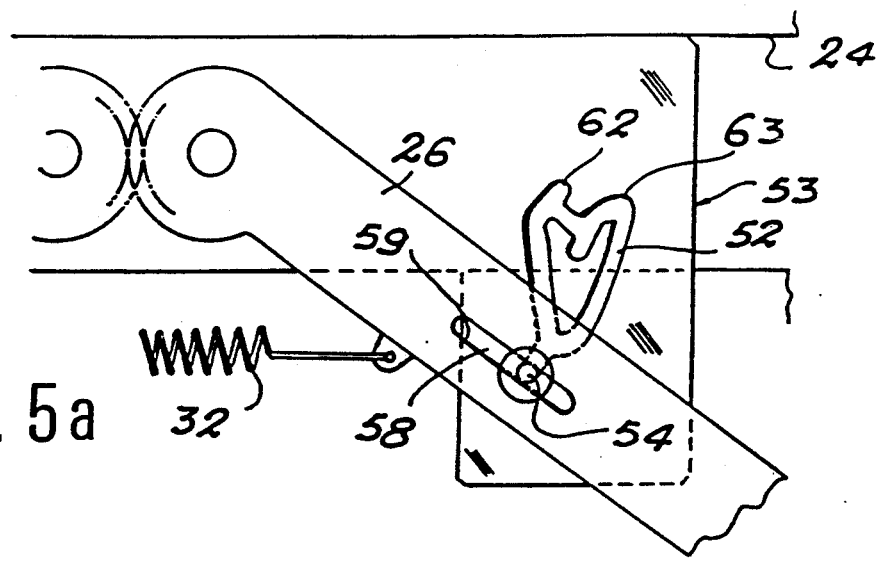
Figure 5B:
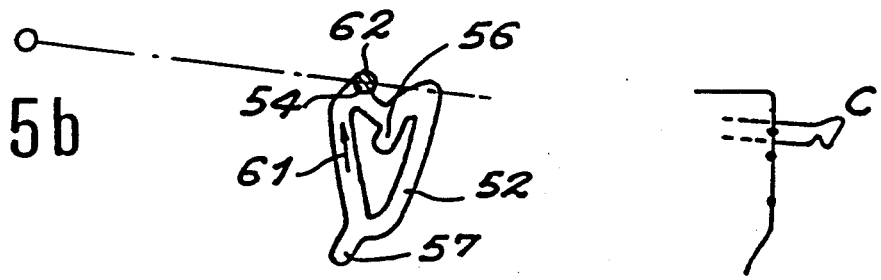
Figure 5C:
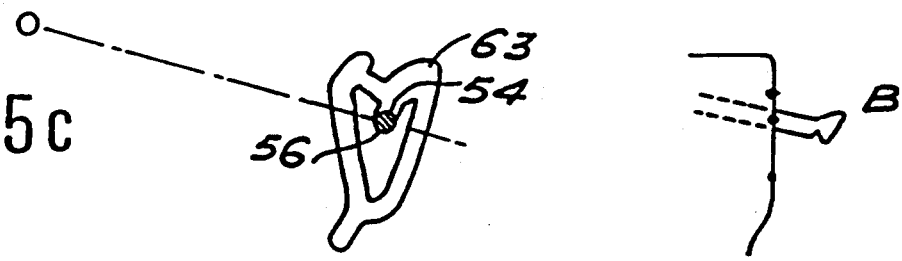
Figure 5D:
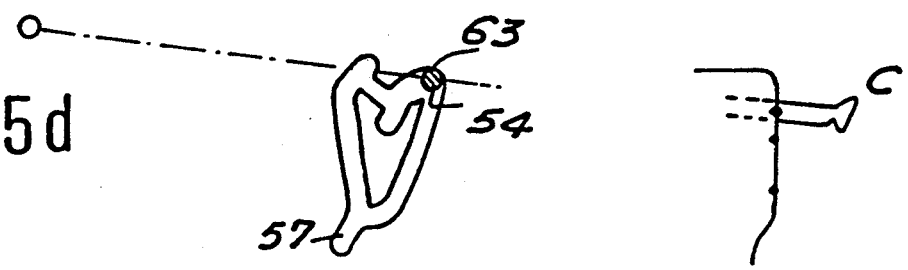

In order to insert a large cartridge, the lever 26 must be rotated towards position C. During this movement, the peg 54 follows path 61 along the groove 52 until it reaches abutment 62 (FIG. 5b). As soon as the lever 26 is released, the peg 54 enters the trap 56 which corresponds to position B (FIG. 5c). While in this position B, a large cartridge is put into place on the plate 20 by raising the levers 25 and 26 to a small extent. These levers are brought together at the end of the cartridge displacement stroke by the action of the spring 32. In order to remove the large-sized cartridge, the lever 25 or 26 needs to be raised slightly.

Figure 5E:
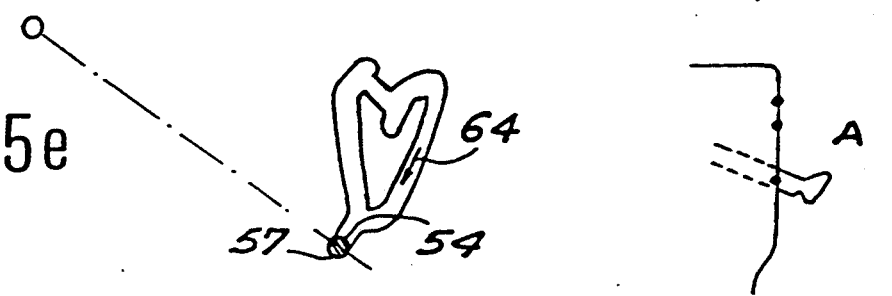

In order to put a small cartridge into place, the lever 25 or 26 should be raised (position C in FIG. 5d) so that the peg 54 reaches the abutment 63, after which the lever should be released to allow the peg 54 to follow the path 64 and come into abutment in trap 57 (position A in FIG. 5e). A small cartridge can then be put into place by raising the levers 25 and 26 a little, which levers then clamp back onto the cartridge under the action of the spring 32.

With such a groove 52, the operating sequence of the positions of the lever 26 is always the following: A then C, then B, then C, and return to A.

Figure 7:
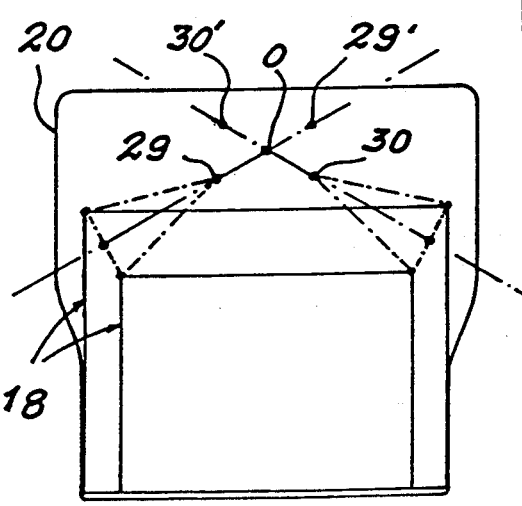
FIG. 7 is a schematic view showing possible positions for the axes of rotation of the levers.
Figure 6B:
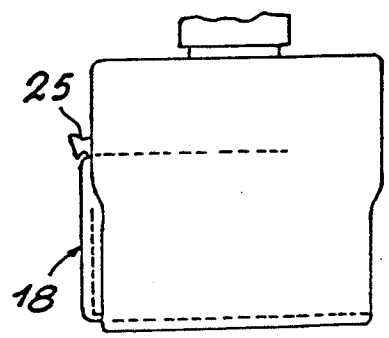

The device described above has two levers 25 and 26 rotating about respective separate axes 29 and 30. However, the device of the invention may also be made using two levers rotating about a common axis passing through point 0 in the diagram of FIG. 7. It may also be made using two levers which cross over each other and rotate about axes passing through the points 29' and 30' (FIG. 7).

The device described above is designed for two cartridge formats, but it may easily be modified to accommodate a third cartridge format. In this case, an additional path should be added in the first groove and an additional trap should be added in the second groove. In the device described, the cartridge bears against the rim 41 of the plate 20 and on the notches 35 and 36. Cartridge retention adjacent to the levers 25 and 26 could be improved by adding a system of sliding rods between the said levers 25 and 26.

What is claimed is:

1. A device for installing X-ray sensitive film cartridges of different formats on a plate, the device comprising:

a lever carriage capable of moving in a slot parallel to the direction along with said film cartridge is installed on said plate;

two pivotable levers movable in rotation and carried by said carriage, with the rotary motions of the levers being equal and opposite, the ends of said levers being designed to resiliently hold two corners of said film cartridge;

at least one first groove formed on said plate;

at least one first peg fixed to one of said two levers and co-operating with said first groove, the path followed by said first groove being designed to allow said levers to rotate to adapt the distance between them to the size of said cartridge, and to allow said cartridge to be displaced over said plate.

2. A device for installing film cartridges according to claim 1, wherein the two levers are provided with a resilient system urging the two levers towards each other.

3. A device for installing cartridges according to claim 2, wherein the resilient system comprises a spring operating in tension and interconnecting said levers.

4. A device for installing cartridges according to claim 1, further including:

a second groove formed on the carriage; and a second peg carried by one of the two rotatable levers, which second peg is movable along said lever and co-operates with said second groove;

said second groove being of the labyrinth type and being designed to impose a sequence of different spreads between said levers.

5. A device for installing cartridges according to claim 4, wherein the lever supporting said second peg includes a slot along which the said peg can move.

6. A device for installing cartridges according to claim 4, wherein said second peg is provided with a resilient braking system.

7. A device for installing cartridges according to claim 1, wherein both levers pivot about a common axis equally and in opposite directions.

8. A device for installing cartridges according to claim 1, wherein the two levers pivot about two respective axes equally and in opposite directions.

9. A device for installing cartridges according to claim 8, wherein the positions of the two axes of rotation of the levers are such that the levers cross over each other.

10. A device for installing cartridges according to claim 1, wherein the ends of the levers are interconnected by a system of sliding rods for bearing against one of the edges of said cartridge.

* * * * *